(12) United States Patent
Walters et al.

(10) Patent No.: US 11,023,510 B2
(45) Date of Patent: Jun. 1, 2021

(54) APPARATUS AND METHOD FOR DISPLAYING RECORDS RESPONSIVE TO A DATABASE QUERY

(71) Applicant: Fastcase, Inc., Washington, DC (US)

(72) Inventors: Edward J. Walters, Alexandria, VA (US); Philip J. Rosenthal, Washington, DC (US)

(73) Assignee: FASTCASE, INC.

( * ) Notice: Subject to any disclaimer, the term of this patent is extended or adjusted under 35 U.S.C. 154(b) by 202 days.

(21) Appl. No.: 13/866,530

(22) Filed: Apr. 19, 2013

(65) Prior Publication Data

US 2018/0101605 A1    Apr. 12, 2018

Related U.S. Application Data

(63) Continuation of application No. 11/736,236, filed on Apr. 17, 2007, now abandoned, which is a continuation of application No. 09/707,910, filed on Nov. 8, 2000, now Pat. No. 7,216,115.

(51) Int. Cl.
*G06F 16/338* (2019.01)

(52) U.S. Cl.
CPC ......... *G06F 16/338* (2019.01); *Y10S 707/917* (2013.01); *Y10S 707/99933* (2013.01)

(58) Field of Classification Search
CPC .................................................. G06F 16/338
See application file for complete search history.

(56) References Cited

U.S. PATENT DOCUMENTS

| | | |
|---|---|---|
| 5,157,783 A | 10/1992 | Anderson et al. |
| 5,515,488 A | 5/1996 | Hoppe et al. |
| 5,642,502 A | 6/1997 | Driscoll |
| 5,717,914 A | 2/1998 | Husick et al. |
| 5,754,766 A | 5/1998 | Shaw et al. |
| 5,794,236 A | 8/1998 | Mehrle |
| 5,809,318 A | 9/1998 | Rivette et al. |
| 5,826,263 A | 10/1998 | Nakabayashi et al. |

(Continued)

*Primary Examiner* — Van H Oberly
(74) *Attorney, Agent, or Firm* — Fresh IP PLC; Clifford D. Hyra; Aubrey Y. Chen (57) ABSTRACT

An apparatus and method for simultaneously displaying both record names and the associated files responsive to a user's search over a database. A user conducts a routine search query over a database or group of databases of records containing, for example, text documents, or alphabetical concordances thereof. The search engine returns a list of records responsive to the user's query. In contrast to the standard list of record identifiers, the apparatus displays both the identifiers and selected portions of those records or other useful information, as defined by the user, facilitating quick review. The user is able to sort the list of these responsive records in a variety of ways, either before the search, or within the list of results, to expedite review. The apparatus identifies records that have been reviewed previously by marking them as "viewed" links. Finally, when reviewing any responsive record in full, the complete list of records is displayed in a side panel, in a way that still allows resorting by the user. This side panel display may be re-sorted "on the fly." It also allows the user to see the identifiers of records anywhere in the list, and to easily jump, such as with a single mouse click, to any record in the list.

19 Claims, 6 Drawing Sheets

(56) References Cited

U.S. PATENT DOCUMENTS

| | | |
|---|---|---|
| 5,848,396 A | 12/1998 | Gerace |
| 5,870,559 A | 2/1999 | Leshem et al. |
| 5,873,076 A * | 2/1999 | Barr .................... G06F 16/951 |
| | | 707/E17.14 |
| 5,873,078 A | 2/1999 | Barr et al. |
| 5,878,410 A | 3/1999 | Zbikowski et al. |
| 5,907,841 A | 5/1999 | Sumita et al. |
| 5,926,806 A | 7/1999 | Marshall et al. |
| 5,966,710 A | 10/1999 | Burrows |
| 5,983,267 A | 11/1999 | Shklar et al. |
| 6,078,914 A | 6/2000 | Redfern |
| 6,101,493 A | 8/2000 | Marshall et al. |
| 6,370,527 B1 | 4/2002 | Singhal |
| 6,415,307 B2 | 7/2002 | Jones et al. |
| 6,463,431 B1 | 10/2002 | Schmitt |
| 6,493,703 B1 | 12/2002 | Knight et al. |
| 6,523,022 B1 | 2/2003 | Hobbs |
| 6,567,800 B1 | 5/2003 | Barrera et al. |
| 6,721,748 B1 | 4/2004 | Knight et al. |
| 2010/0332520 A1 * | 12/2010 | Lu .......................... G06Q 50/18 |
| | | 707/769 |
| 2011/0191167 A1 * | 8/2011 | Agarwal ............ G06Q 30/0275 |
| | | 705/14.45 |
| 2012/0030195 A1 * | 2/2012 | Holt .................... G06F 16/345 |
| | | 707/722 |

* cited by examiner

Figure 1

Showing 1-10 of 609 Results
Next 10 Results ( Case ) ( Court ) ( Date ) ( Relevance )

1. ☐ UNITED STATES OF AMERICA v. NORBY (7th Cir., Jun. 30, 1993) 100%
WALTERS, No. 92-3420

EASTERBROOK, Circuit Judge. Norby Walters, who represents entertainers, tried to move into the sports business. He signed 58 college football players to contracts while they were still playing. Walters offered cars and money to those who would agree to use him as their representative in dealing with professional teams. Sports agents receive a percentage of the players' income, so Walters would profit only to the extent he could negotiate contracts for his clients. The athletes' pro prospects depended 2. ☐ Walters v. Comm'r of Social Security, (8th Cir., Oct. 15, 1997) 74%
No. 96-2214

KAREN NELSON MOORE, Circuit Judge. Claimant-Appellant Clarence Walters appeals a district court decision affirming the Commissioner of Social Security's denial of his application for disability insurance benefits under the Social Security Act (the "Act"), 42 U.S.C. § 423. For the reasons that follow, we affirm. I. BACKGROUND A. Facts Walters, who has a twelfth-grade education, worked for Chrysler Motor Car Company from 1972 to 1989 as a press operator. Joint Appendix (J.A.) at 37-38 (Tr. of ALJ Hr'g at 3. ☐ Horace R. Walter; Donna L. Walter v. United States of (8th Cir., Jul. 8, 1998) 60%
America, No. 96-3828

LOKEN, Circuit Judge. Horace and Donna Walter farm and feed cattle in rural Clark County, South Dakota. By 1985 and 1986, the tax years in question, they were feeding and selling over 8,000 cattle per year and farming about 2,000 acres. In their joint federal income tax returns for those years, the Walters reported taxable income of $195,353 in 1985 and $204,513 in 1986. In 1988, the Commissioner of Internal Revenue audited the returns, increasing the Walters'

4. ☐ Diehl v. Tele-Solutions, No. 93-3911 6th Cir. Jun. 14, 1995 45%

Sort First By:
Search Relevance
Then By:
Date
Then By:
Search Relevance
Display Results
10 items per page
Text to Display in Case List:
1st 5 Lines
Search

*Figure 2*

Untitled - Microsoft Internet Explorer
File  Edit  View  Favorites  Tools  Help
Address:

fastcase.com 303

Case List / Re-Sort

Display 1-10 of 609

☐ UNITED STATES OF AMERICA v. NORBY WALTERS
No. 92-3420
(7th Cir., Jun. 30, 1993)

☐ Walters v. Comm'r of Social Security,
No. 96-2214
(8th Cir., Oct. 15, 1997)

☐ Horace R. Walter; Donna L. Walter v. United States of America,
No. 96-3828
(8th Cir., Jul. 8, 1998)

Clarence Walters
v.
Commissioner of Social Security,

No. 96-2214
U.S Court of Appeals for the Sixth Circuit
October 15th, 1997

Click to see the full case heading information.

Before: JONES, SUHRHEINRICH, and MOORE, Circuit Judges.

OPINION

KAREN NELSON MOORE, Circuit Judge. Claimant-Appellant Clarence Walters appeals a district court decision affirming the Commissioner of Social Security's denial of his application for disability insurance benefits under the Social Security Act (the "Act"), 42 U.S.C. § 423. For the reasons that follow, we affirm.

I. BACKGROUND

A. Facts

Walters, who has a twelfth-grade education, worked for Chrysler Motor Car Company from 1972 to 1989 as a press operator. Joint Appendix (J.A.) at 37-38 (Tr. of ALJ Hr'g at 9-10); Appellant's Br. at 2; Appellee's Br. at 3. His job required him to operate both small presses (which involved constant standing/walking and lifting of approximately 3-5 pounds) as well as heavy presses (which involved constant standing/walking and lifting of 25-30 pounds). J.A. at 39-41 (Tr. of ALJ Hr'g at 11-13). Walters also testified that his job sometimes required him to stoop, bend, and reach overhead. J.A. at 58-59 (Tr. of ALJ Hr'g at 30-31). In November 1989 lines    page    case

Walters v. Comm'r of Social Security (8th Cir., Oct. 15, 1997)

APPARATUS AND METHOD FOR DISPLAYING RECORDS RESPONSIVE TO A DATABASE QUERY

RELATED APPLICATIONS

This application claims priority under 35 U.S.C. § 119 to provisional application No. 60/164,549, filed Nov. 10, 1999, the entirety of which is incorporated herein by reference. This application is also a continuation of application Ser. No. 11/736,236, which is a continuation of application Ser. No. 09/707,910, now U.S. Pat. No. 7,216,115, and the entirety of both aforementioned applications is incorporated herein by reference.

FIELD OF THE INVENTION

The present invention pertains to the field of computerized information search, display, and retrieval systems and methods. More particularly, the present invention relates to an apparatus and method of expediting the review of records responsive to such a search, by more efficiently displaying, representing, sorting, and navigating such responsive records.

BACKGROUND OF THE INVENTION

For centuries, researchers have pored over books, reading document after document to inform their knowledge of a certain field. These searches are time-consuming and cumbersome, frequently involving the review of documents that are not on point failure to locate relevant documents. With the advent of computers, companies have created searchable databases of research materials. In a computerized search, the user enters a search query, usually using "keywords" or Boolean search terms, and is given a list of documents in the database that meet the requirements of the search. The user can then review responsive documents, search within that subset of responsive documents, or conduct another query. Research of this sort generally takes place on a local computer system, on compact discs or other storage devices, over a dial-up modem connection, and more recently via the Internet.

Research materials can comprise files in various formats, from unstructured strings of characters, sentences, or text files, to very highly structured data. They can be of a wide variety of data classes, such as words, numbers, graphics, etc. In other cases, the research materials might be contained, for example, in a database. A simple database might be comprised of a single file containing many records, each of which contains the same set of elements (sometimes referred to as fields, items, etc.) where each element is a certain fixed width and a certain format. More complex databases often contain a large number of files, with each file itself containing many, many records of both fixed and variable-width elements in a variety of formats. One great advantage of searching databases by computer is that the user may determine how broadly or narrowly to conduct searches, allowing the user, to a certain extent, to control the number of responsive records. This is especially helpful because researchers, to be thorough, frequently must review each responsive record, often numbering in the hundreds or thousands. One example of this type of text retrieval system is Anglo-Dutch conglomerate Reed-Elsevier's "Lexis/Nexis" system.

Despite great advances in computer-assisted research, reviewing responsive records remains time consuming, inefficient, and dreadfully dull. Searches yield sets of responsive records that are both underinclusive and overinclusive—queries do not return important records that are not literally responsive to a user's Boolean request, and they often return irrelevant records that are incidentally responsive to a user's query. In order to tell whether a query was well formulated, researchers must often review, one record at a time, scores of responsive records. In a long list of records, the user may be required to review all responsive records in order to guarantee the comprehensiveness of the research assignment. Many times, reviewing records responsive to a query is akin to looking for a needle in a haystack.

A further disadvantage with typical computerized research systems is that search engines will return a list of only the titles or other identifiers of responsive records, which tells very little about the contents of those records. To view in full a record in the list, the user must use a mouse or other pointing device to click on a link in the list, which takes the user to the beginning of that individual record. The user can either skip sequentially from record to record, through the entire list of records, in the order they were listed, or jump back and forth between individual records and a list of identifiers. For a user to skip several records ahead or back in the list, she must either review all the records in between, or return to the list of identifiers and click a separate link. Review of results involves a lot of toggling back and forth between a list of responsive records and the full body of the records themselves, and especially with slow connections to the Internet, this can be time consuming.

A further disadvantage of current computerized research systems is that users frequently retrieve the same records, over and over, in subsequent searches. One common problem is illustrated by the following scenario. Assume that a user conducts a search over the database of research materials, yielding 80 results. The user reads all 80 records and decides that she did not find a record responsive to her needs. The user then reformulates the query, to which the search engine returns 50 responsive records. Unable to remember all the titles of the 80 records already reviewed, the user must then read through all 50 records returned by the second query, even records she has already reviewed.

Therefore, what is needed is an apparatus and method for expediting computerized research by allowing users to view more information about responsive records in a summary fashion. This would allow users to view, in a list of responsive records, both the record identifier, as well as certain portions, fields or elements of those records, as determined by the user. Researchers then more easily could skim a list of responsive records to determine whether they are important to the research task at hand. The apparatus would further allow users to change the type or length of fields or elements that are listed, either at the time of the query or while reviewing the list of results. Furthermore, when a user reviews a record in full, the apparatus would display the list of responsive records in a "side panel," so that the user could re-sort the list "on the fly," or jump effortlessly several records forward or back in the list of responsive records.

SUMMARY OF THE INVENTION

In view of the problems associated with digital search and retrieval systems, the present invention advantageously expedites computerized research by providing an apparatus and method for displaying, representing, sorting, and navigating responsive records.

The present invention also provides a mechanism for displaying a list of records responsive to a user's search that includes user-defined portions of responsive records. Providing more information in a list of responsive records reduces the need to access the full text of records in order to determine whether the record is relevant to the user's research.

The invention also reduces the user's need to switch back and forth between lists of identifiers of responsive records and the full body of those records, by displaying fields or other portions of the records in the list of responsive records along with the record identifiers, and by displaying the list of responsive records (e.g., by displaying their identifiers) along with the display of a portion of any responsive record, such as displaying the record in full.

The invention advantageously expedites review of responsive records, both by allowing users to sort the list of such records, and by showing users which records they have already reviewed. This may also be achieved by listing identifiers for responsive records in a side panel while the user reviews any responsive record in full. This allows the user to select different records or to jump forward or back a number of records at a time by clicking on the identifiers. This also allows users to re-sort the list of responsive records in the side panel.

One embodiment of the present invention provides a method for displaying records responsive to a database query comprising the steps of: (i) displaying a list of identifiers for a plurality of responsive records; and (ii) displaying selected elements of at least one of the responsive records, wherein the list of identifiers and selected elements are displayed simultaneously.

In yet another embodiment, an apparatus for displaying records responsive to a database query is presented. The apparatus comprises means for displaying a list of responsive records, and means for displaying selected elements of at least one of the responsive records, wherein the list of identifiers and selected elements are displayed simultaneously.

In other aspects of the present invention, an apparatus and a method for expediting legal research, in computerized searches of legal materials, including without limitation judicial opinions, statutes, regulations, regulatory decisions, Security and Exchange Commission filings, briefs, pleadings, docket entries, treatises, articles, and other law-related information, are provided.

In yet another aspect of the present invention, information retrieved from searches over databases of subsequent history information for such legal materials is displayed in user-defined lists. This embodiment includes displaying a list of document titles in a side panel while viewing the full text of any document returned by the search. In a further aspect of the present invention, a list of the titles of responsive records, as well as user-defined portions of those records, are displayed. In yet a further aspect of the present invention, the responsive records whose identifiers, title, or other elements are to be displayed, are identified by use of an apparatus that uses the searching and sorting methods described below.

Typically, although not necessarily, the present invention is implemented along with, or as part of, a computerized information search and retrieval system. The user conducts a search by selecting a database and parameters for the search (including, for example, date or field restrictions), then enters a Boolean or other search query. The user then selects display preferences, such as how she wants to sort the responsive records and what portions of those records (if any) should be displayed in the list. The computer system performs a search of a database and/or associated alphabetical concordance and returns a list of records that are responsive to the user's search.

The search of the database may be done by standard methods, such as standard Boolean searching. Alternatively, or in addition, the search may be modified or replaced with other kinds of searches, such as natural language searches. These alternative searches may return records that would not normally be responsive to a Boolean search. In another embodiment, a standard Boolean search might be followed by an "extended reference search." The extended reference search begins by checking which documents are referenced by those returned by the standard Boolean search. Any document referenced by more than a predetermined percentage, e.g., 15% in a preferred embodiment, of the responsive documents, is then added to the search result even if it is not originally part of the search result. This process may be repeated recursively.

In another class of embodiments, the results of prior searches, either by the same user, by similar users, or by all users, are tracked. In one embodiment, the number of times a record is returned by a search for given terms or keywords is recorded in a table or array in a manner in which the number is linked to the search terms or keywords. Using this table or array, it is possible to perform a search of a database by returning records that were frequently returned by other similar searches (e.g., those using the same or similar terms or keywords) without actually performing a Boolean search. In another embodiment, the results of similar searches are used to supplement the results of performing a standard Boolean search. In another embodiment, the table or array of similar results is used to modify the relevance of records. If a record is found with high frequency on that table, its relevance score is increased, affecting the position in which it, its identifier, or some other element, will be displayed. All of the embodiments involving the array or table containing counts of the number of times each record is returned by similar searches may be enhanced by tracking instances in which the record was not only returned as responsive to a search, but also was selected by the user. In this embodiment, for example, the search would be counted in the table or array only if the user actually printed, downloaded, or read the record in full.

Some of the advantages of the non-Boolean search features of the present invention are illustrated in the preferred embodiment of a legal research system. Here, the user searches, for example, judicial opinions for certain terms or keywords. In one embodiment, a Boolean search is first performed, returning a set of opinions. The search engine then checks each opinion to determine which other documents are referenced by those opinions. In another embodiment, rather than using a search engine, a table or array is used to store a list of all references by each document, to each document, or both. Then, any document referenced by 15% of the documents in the initial search result are added to the search result. The process may be repeated over the new set of documents. The number of references to each document may also be used in determining its relevance and the position where each document or its citation may be displayed. For example, any documents cited by more than 50% of the search result may be placed ahead of those only cited by 30% of the search result. In another embodiment, the percentage of documents citing each document is only one relevance factor, combined with other measures of relevance to allow sorting. In another embodiment, a table is constructed with all or most search words or keywords. Then, each time a search is performed with those words or keywords, the results are added to the table with those words or keywords. In another embodiment, the records are only recorded in the table when a user accesses the document, for example to download or print it. However constructed, this table is used to identify documents that other users have found to be important for certain terms or keywords. If a user searches for "breach" and "contract," for example, the documents that appear most often under these terms (or only those that appear most often under both terms) can be returned, either as an independent search result or as a supplement to a standard Boolean search result. The number of times a given document has been found responsive to similar searches can also be used as a measure of relevance, either alone or in combination with another relevance index.

Preferably, the system then displays a list of responsive records according to the user's preferences. For the preferred embodiment of a display of a list of responsive legal documents, the list may include, for example, any combination of the following elements: a descriptive title of each document, its docket number, citation, source, authorship, date information, a search relevance ranking, as well as any text the user elected to display. Displayed text could include, by way of example and not limitation, the first paragraph of the document, the first 50 words of the document, the first n lines of the document (where n is an integer), the paragraph of the document most relevant to the search, or no text at all.

Relevance is computed as a function of the frequency of appearance of the search terms and their proximity. For example, in one preferred embodiment, records that have a higher frequency of search terms are considered more relevant than those with a lower frequency. In another preferred embodiment, extra weight is given to records that contain all or most of the search terms, even if the absolute frequency is lower. In a further preferred embodiment, the number of words between each search term and the nearest search term is computed. Records that have a higher frequency of pairs of search terms with few words between them are deemed more relevant that those with lesser proximity between them. In another preferred embodiment, frequency and proximity are combined.

For example, assume there are three documents, 1, 2, and 3, found by a Boolean search for three search terms, A, B, and C. Assume the documents have the following frequencies and proximities:

Document 1: A at positions 2, 76, 756, 767, 4956, and 95654.

Document 2: A at 2 and 6, B at 3 and 9, C at 17

Document 3: A at 2 B at 877 and C at 8604

If simple frequency is the measure of relevance, document 1 is the most relevant with six search terms, then documents 2 and 3. If double weighting is given for occurrences of all three search terms, 2 is the most relevant, with 1 and 3 tied for second most relevant. Using proximity, document 2 is the most relevant because the first A and the first B are adjacent, the second A and second B are 3 apart, and the last B and first C are 8 apart. If an index is created by summing the proximity of the nearest three pairs, the index for document 3 is 12. For document 1, the index is 775 and for document 3 there are not enough pairs to evaluate proximity. In order of relevance, the documents are sorted 2, 1, 3. Frequency and proximity may be combined in a variety of ways. For example, they both can be applied separately and the results averaged. Alternately, the proximity index can be normalized to the greatest frequency of search terms found in any record and then added to the frequency.

The user could scroll up and down the list, reviewing both the titles (or other identifiers of responsive records) and the relevant portions of those documents. The user could re-sort the list on the fly, by any information in the list. She could also change the amount or type of text, fields, or other portions of records displayed in the list. This allows the user, at a glance and without accessing the documents in full, to better evaluate the usefulness of her query, and to evaluate which records are important to the research task at hand more efficiently.

The display also may allow the user to determine which records, if any, have been returned by prior searches or that have been selected by the user, for example, for printing. To do this, a running list of records, identified by their unique identifier, is preserved and associated with the user's unique ID. When a subsequent set of records is to be displayed, the identifiers of those records are checked against the preserved list to find the repeated documents. Repeated records are identified in the display, for example, by making their identifier's bold or of a different color. Similarly, if the user selects the document, for example by clicking on its identifier or by printing it, that document's identifier is added to a different list which is also associated with the user's ID. The identifier's of new records to be displayed are also checked against this list to determine those already selected. They are displayed in a different fashion, for example by using a different color, boldness, or a special icon.

Typically, the user selects any document on the list, using input devices such as a mouse, keyboard, stylus, microphone, or other selection device. For the preferred embodiment where the system or method of displaying records is combined with a search to first identify those records, the computer system then displays the full record with search terms highlighted therein. The user can jump from term to term, page to page, or field to field, or element to element, within a record, or jump from one record to the next using, for example, navigation keys. In addition, the system displays a list of the titles of all responsive records in a side panel. This list may be re-sorted on the fly, and the user may scroll up and down the list of responsive records, independent of the individual record being displayed. Using the methods described above, the user can select any record in the side panel—including records several places ahead or behind the displayed record in the complete list—and the system will display the selected record in full (or in part), with the complete list of responsive records in a side panel.

In one preferred embodiment of the present invention, the database is highly structured using XML tagging. This permits ready identification of all elements, fields and other unique portions of each record, such as the record identifier. XML-identified content is then used in the displays in a variety of ways, including to identify the records.

Another preferred embodiment of the invention is to apply it to legal databases of cases, statutes, regulations, and administrative opinions. This embodiment is illustrated in the drawings. The steps in all methods may be performed in any order, unless expressly stated otherwise.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates a list of records returned by the user's search, including several sorting, display, and navigation features.

FIG. 3 illustrates the display of the full text of a responsive record, along with a side panel including the list of titles of the returned records.

DETAILED DESCRIPTION

An apparatus and method are described for displaying records. In the preferred embodiment, such apparatus and method are combined with an apparatus and method for expediting legal research by displaying, representing, sorting, and navigating text files identified by a search engine. In the following description, for the purposes of explanation, numerous specific details such as mathematical formulae, algorithms, menus, and the like are set forth in order to provide the best mode of the present invention. It will be apparent, however, to one skilled in the art that the present invention may be practiced without these specific details, and is not limited to the specific details shown and described. In other instances, well known structures and devices are shown in block diagram form to more clearly set forth the present invention.

Figure 1:
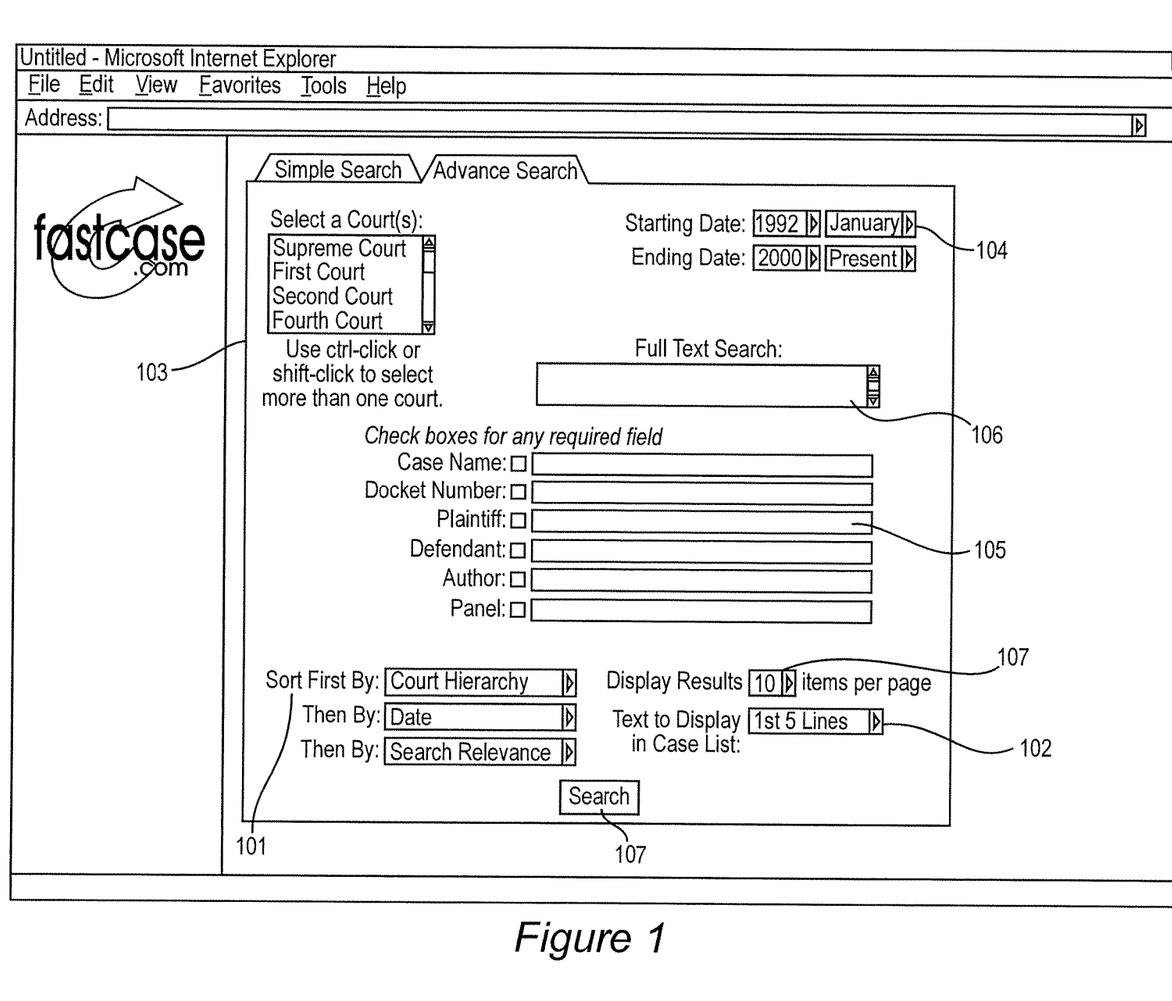
FIG. 1 illustrates an exemplary embodiment of a window displayed on a CRT or other display, which can be used as a user interface for the present invention, including a search dialog box.

FIG. 1 shows a search screen or window 100, as may be displayed on a CRT, as an example of one possible user interface for the query screen on a research system. A user first selects a database or group of databases on which to conduct a search 103, for example, cases of the U.S. Supreme Court. The user then delimits the search using such factors as date restrictions 104, and then enters either a Boolean text search 106, a field search within the database 105, or a combination of the two.

Before or after conducting the search, the user may customize the list of records that will be returned, including how the results of the search will be organized and what information the system will return about each record. She may select fields by which to sort results on the search screen 100, such as the date of the record, the relevance of the record to the search, or by which database the record came from 101. The user may sort first by one criteria, then break ties using second- and third-order sorting fields. So, for example, if the user chose to sort by "Court Hierarchy," then by "Date," then by "Search Relevance," the system would display documents issued by the highest court first, for example from the U.S. Supreme Court. Supreme Court documents would be further sorted in date order, and cases from the same date would be listed in order of relevance. In the preferred embodiment, instead of customizing the sort order, a user could also use the system default.

The system also allows the user to decide how many records to list per page in the list of returned records 107. The user may select a smaller number of records to display on each web page, for example, to speed the loading time of the web page. Conversely, the user may select a large number so that she can view all the returned records without having to link to another page. Finally, the user may customize what kind of text or other portions of the record will be displayed in the list of returned records 102. For example, with text documents, the user may select the first 6 lines of the document, the first 12 lines of the document, the first paragraph of the document, the most relevant passage or paragraph from the document, or no text at all. In one embodiment, the user then conducts the query by selecting "Search" 107.

In one preferred embodiment of the invention, it is combined with a search engine that searches the selected database and returns a user-customized screen 200 listing responsive records, which is illustrated in FIG. 2. For each responsive record, the system lists, for example, a document title or other identifier 210, which is hyperlinked to the full record. Each entry also may display information that identifies the record, its source, date, and a relevance score for the query, as well as selected text or other portions of the record itself 201. Records previously viewed by the user would be identified as such, for example, either through the use of text, icons, or display of the record identifier as a "viewed hyperlink," using, for example, either a different color for the identifier, or the browser default for viewed hyperlinks. In a preferred embodiment, records that appeared in a previous list of responsive records, but which were not selected for a full-text view, are identified as such, either with text, an icon, or by the use of a different color for the hyperlinked identifier. Thus the user can avoid duplication of effort, by choosing not to view records in full that she has already reviewed. She would also be able to identify records added to the list after she modified a search query or conducted a new search with different terms.

As requested by the user, the system will display a certain number of records per page 202, as well as a link the user can use to jump to the next n records in the list 203. This display allows the user to scroll through the list of records in whatever order is most helpful in the search. The display of text or other portions of each record reduces the amount of time and effort spent by the user switching back and forth between screens trying to discern whether a given document is important to the research being conducted. Because the user can customize and view text or other portions of records in the list, she has more information on the list screen, allowing her to avoid reading records that are demonstrably unimportant or demonstrably irrelevant, based on a reading of the displayed portion.

In one preferred embodiment, the user can re-sort the document list on the fly, either by clicking any of the headers 204, in this example "Case," "Court," "Date," or "Relevance." Clicking "Date," for example, would re-sort the records in descending order of the record's issue date. The user could also re-sort the list using the sorting options in the side panel 205, which offers the same multi-level sorting options as the search query screen 101.

From the list of displayed cases in FIG. 2, the user can also change the number of records displayed per page 206 and the amount and type of text or other portions of the record to display in the list 207, the same options offered in the search query screen in 107 and 102. When the user has selected new display properties, she presses "Resort" 208, and the system re-sorts the list. These sorting and re-sorting options allow the user to review the list of responsive records more efficiently—especially when the list is long, or when the user is looking for a specific document. Re-sorting allows the user to manipulate the list to bring important records to the top, using any of a number of different sorting algorithms. The user can conduct a new search ("N"), modify the current search query ("M"), or search within the displayed results ("R") by clicking the appropriate button 209 for those tasks. The user may also decide to sort the results by other sorting mechanisms, such as the extended reference search method described above by clicking similar buttons or choosing different options in a tab.

In order to view any record in the list in full (or to view an expanded portion of any record), the user would click the hyperlinked identifier of the record. The system would then display the record in full, as illustrated in FIG. 3. One section of the screen would display the full record itself 301. The user can navigate the text using a standard browser scroll bar, by using a keyboard to move the cursor within the record, or by way of navigation buttons 305-307. By using "Term" navigation buttons 305, the user can jump from search term to search term within the document 305. Similarly, by using "Page" navigation buttons 306, the user can jump ahead or back one page at a time. Finally, the user can use the "Case" or "Document" navigation buttons 307 to jump one record forward or back in the list of responsive records. During this process, no matter what part of the record the user is viewing, the record's title or other identifier and citation information appear in a navigation bar 308 at the bottom of the screen.

A section of the display screen, depicted as panel 302 in FIG. 3, is used to display a list of responsive records 302. The list displays in the same order as it last appeared in the record list in FIG. 2, that is, before the user selected the full text or other portion of a record on the list. The user may scroll through this list independently of the full text or other portion of a record from within the list. The title of the displayed record will appear highlighted within the list in this side panel. This allows the user to view the list of responsive records without returning to the full list, and greatly facilitates navigation of the list. For example, the user could select to view the full text of a record five titles down the list by scrolling down and selecting the hyperlinked title or other identifier of that record, without having to go back to the complete list of responsive records. This reduces the transaction time of the standard mode of reviewing records in the list.

As with the responsive record list illustrated in FIG. 2, the preferred embodiment identifies records previously viewed by the user, either through the use of text, icons, or display of the title as a "viewed hyperlink," using either a different color for the title or identifier, or the browser default for viewed hyperlinks. Again, records that appeared in a previous list of responsive records, but which were not selected for a full-text view, can be identified as such, either with text, an icon, or by the use of a different color for the hyperlinked title.

The user has the option of re-sorting the list on the fly from the full record text screen of FIG. 3. By selecting the "Re-sort" tab 303, the user is given all of the same multi-level sorting options from the search query screen 101, and from the screen listing the responsive record 200. This facilitates review of recording the list, allowing the user to full the most helpful records to the top of the list, without having to go back to the full list of responsive records illustrated in FIG. 2.

Finally, from the full text view illustrated in FIG. 3, the user has a series of navigation options. She may return to the full list of responsive records illustrated in FIG. 2 by selecting a button option 304. She may also conduct a new search, modify her existing query, or search within the results by selecting one of those button options 309, similar to the options 209 in the list of responsive records illustrated in FIG. 2.

Figure 4:
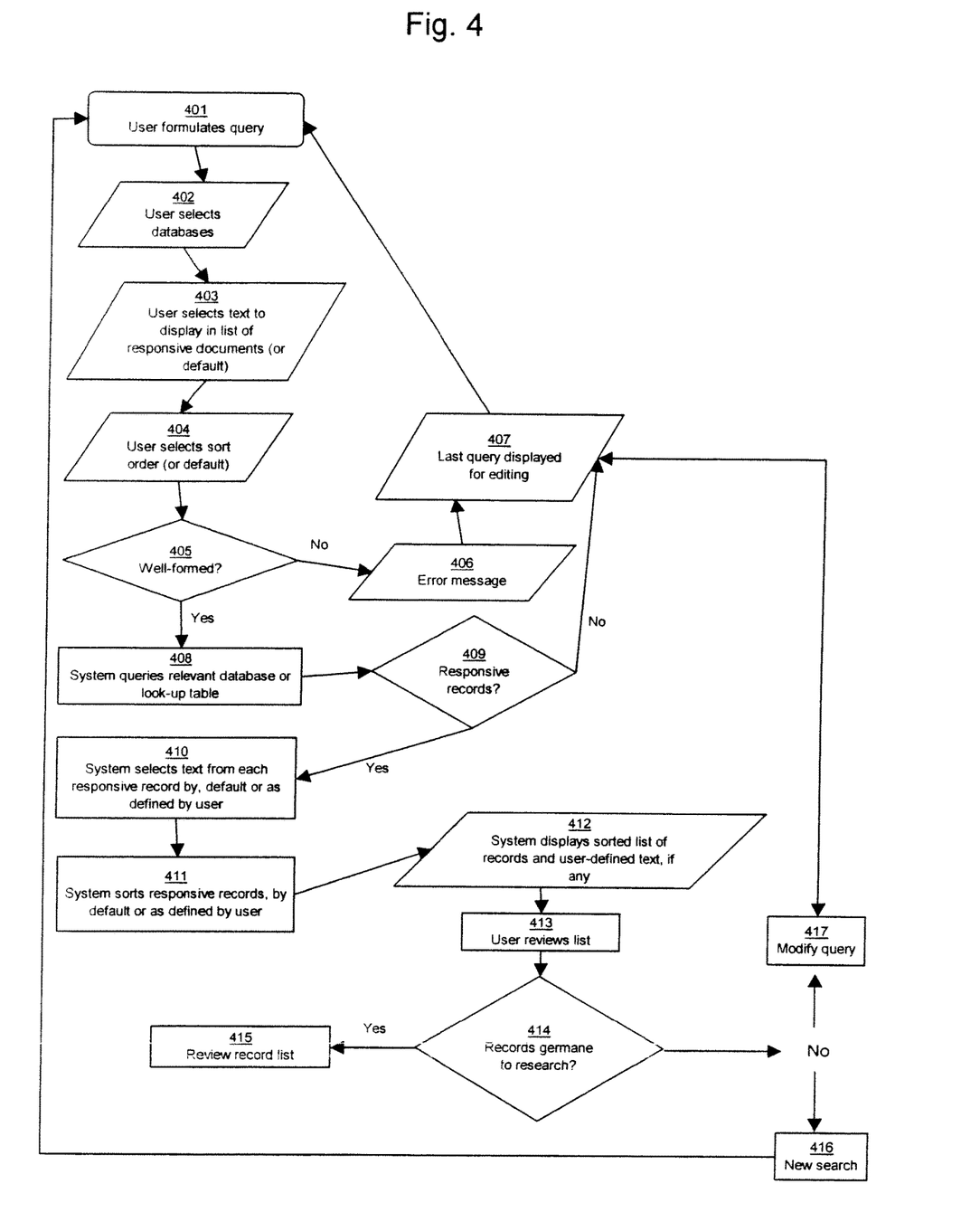
FIG. 4 illustrates a flow diagram for a query in one embodiment of the invention.

FIG. 4 is a flowchart illustrating one embodiment of the steps involved in a simple search of a database as part of this invention. First, in step 401, the user formulates and enters a query. The query may use key words or phrases and be constructed using Boolean logic. The user may then select the databases in which the search will run, for example, the U.S. Supreme Court, or the Fourth Circuit Court of Appeals (step 402). Next, the user selects the amount of text to be displayed for each responsive document in the list of responsive documents. See step 403. The user may also select the sort order for responsive documents (step 404). Documents can be sorted, for example, by court hierarchy, date, and relevance, in any order. The user may also select more advanced document sorting options. Alternatively, the user may skip steps 402, 403, and 404, instead relying on default values.

The user then submits the query, and the system judges whether or not the query is well-formed (e.g., if the query is a Boolean search, whether the syntax is correct; alternatively, whether the user selected at least one database to search over) in step 405. If the query is not well-formed, the system returns an error message in step 406, then displays the query for editing in step 407. If the search is well-formed, the system queries the relevant database or look-up table associated with selected database in step 408. If one or more responsive records is not found via step 409, the query is again displayed for editing when processing is returned to step 407, perhaps with a message indicating that no responsive records were found. If responsive records do exist, the system selects text from each responsive record by default or as defined by user, as shown in step 410.

Next, the system sorts the responsive records by a default method or by a method defined by the user in step 411. Subsequently, the system displays the sorted list of records and, if requested by user or required by a default rule, an amount of text from each document. See step 412. The user then reviews the list (shown as step 413) and decides if the documents returned are sufficiently germane to the research topic (step 414). If the documents are germane, the user reviews the full records list in step 415. If not, the user may choose either (i) to modify the query, as shown in step 417, in which case the system displays the last query for editing and accepts editing commands, step 407, or (ii) to begin a new search, as shown in step 416, wherein the system displays a blank search page and the process begins anew in step 401.

Figure 5:
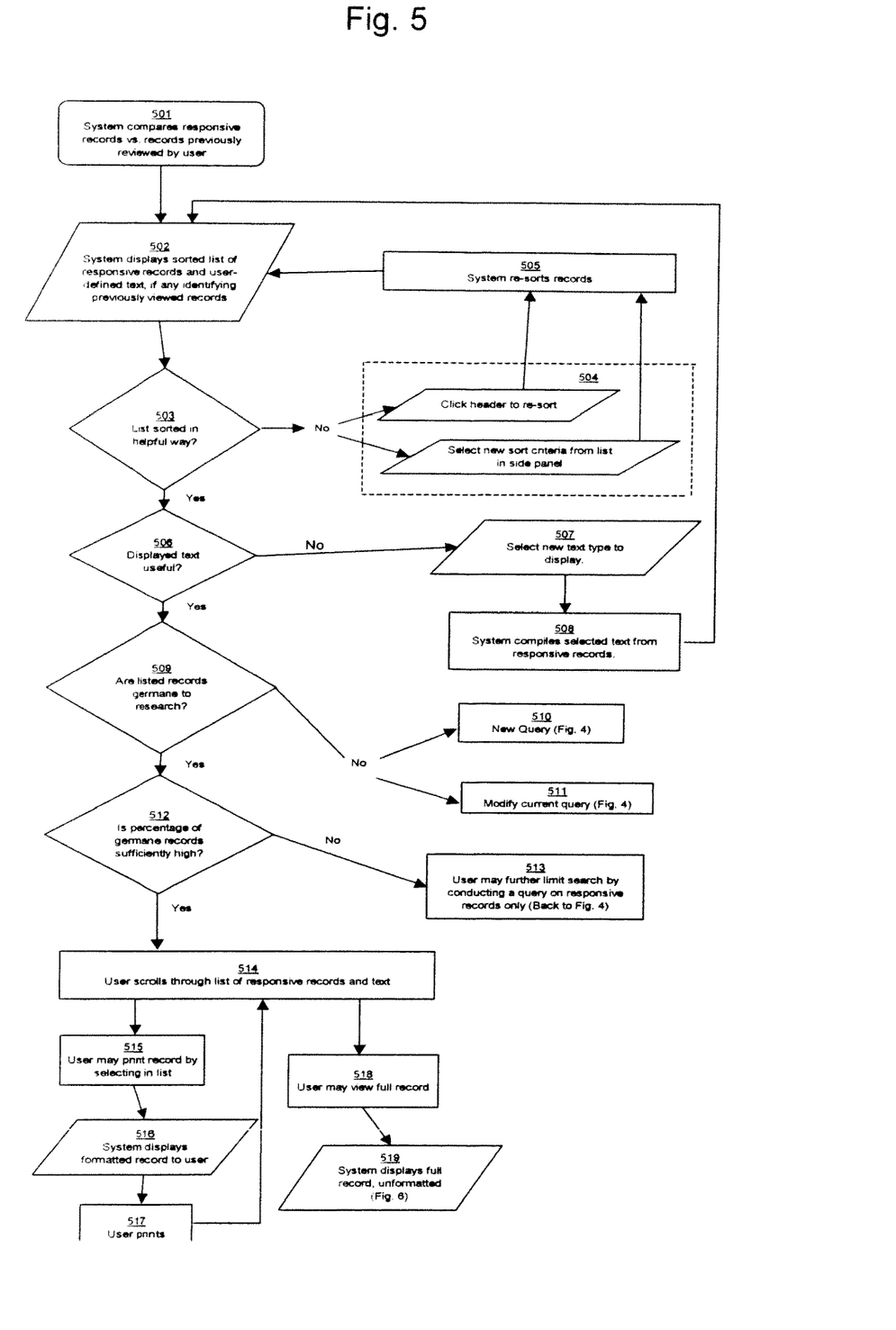
FIG. 5 illustrates a flow diagram of options provided to a user by one embodiment of the invention after a query is performed.

FIG. 5 is a flowchart illustrating an embodiment of steps after a user has chosen to view a record list resulting from a search, as shown in step 415. First, in step 501 the system compares the responsive records with records that the user has previously reviewed, if any. Next, the system displays a sorted list of responsive records, clearly marking records that the user has viewed before, and user-defined text (if any). See step 502. The user then decides in step 503 if the list is sorted in a helpful way. If not, the user may, as shown in step 504, select new sort criteria from a supplied list and click page header to re-sort. The system then re-sorts the records in step 505 and displays them in an updated list (step 502).

If the method of sorting is satisfactory, the user must then decide whether or not the displayed text is useful. See step 506. If the user determines that it is not, the user selects a new text type to display in step 507. Continuing with this scenario, the system extracts the newly selected text from responsive records in step 508 and again displays the sorted list of responsive records, identifying records that the user has previously viewed, and user-defined text (if any) in step 502. If, alternately, the displayed text is acceptable, the user decides if the listed records are sufficiently germane to the research in step 509. If not, the user may start a new query as shown in step 510, or modify the current query, step 511, returning to the steps in FIG. 4 in either case. The user also may consider whether the percentage of germane records is sufficiently high. If it is not, the user may return to FIG. 4 and further limit the search by conducting a query on responsive records only, as shown by step 513. If the percentage is sufficiently high, the user browses through the list of responsive records and text in step 514.

Next, the user may choose to print a record, or view a record, or both, in any order. The user may print a record by selecting it in the list in step 515. The system then displays the formatted record to the user in step 516, and the user confirms the print in step 517. Alternately, the user may choose to view a full record in step 518, in which case the system displays the full record, without special formatting, shown in step 519. This scenario is illustrated in FIG. 6.

Figure 6:
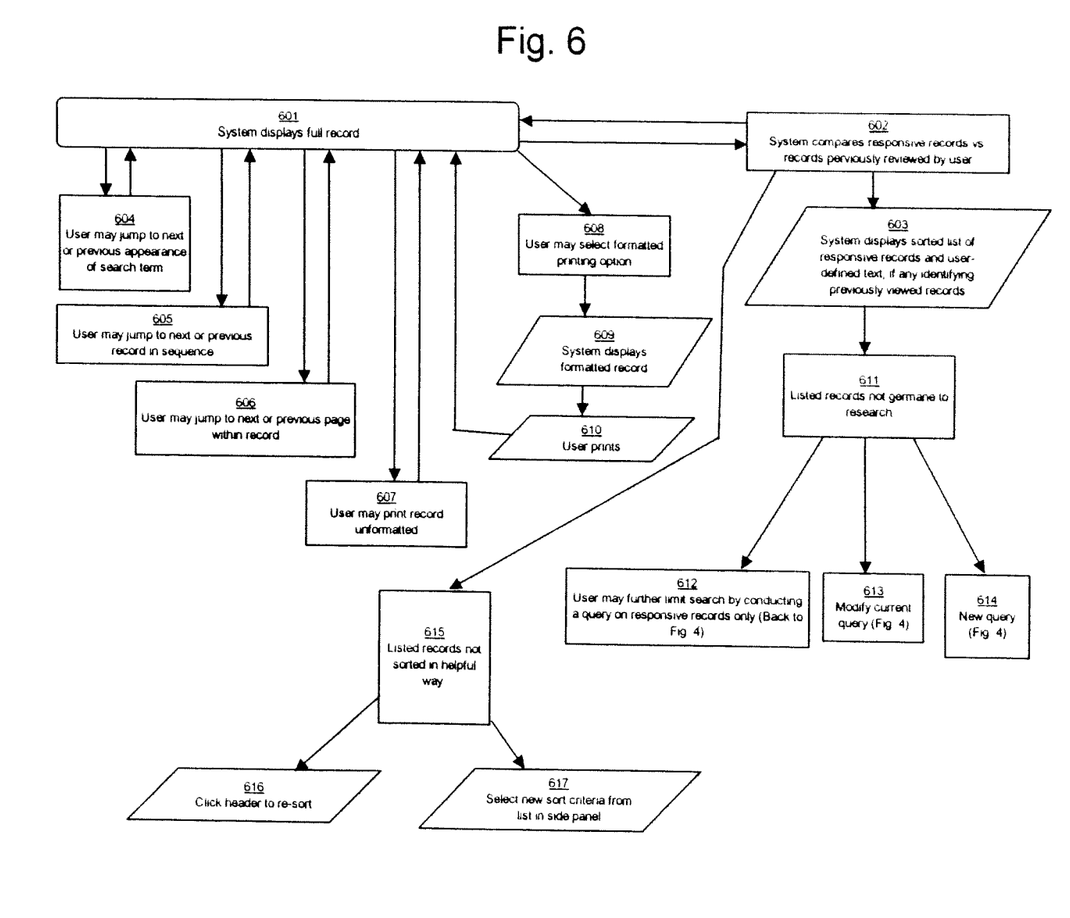
FIG. 6 illustrates a flow diagram of one embodiment of the invention after responsive records are displayed in part or in full.

FIG. 6 illustrates an embodiment of the steps taken after a user opts to display a full record. In the main window, the system displays the selected record in step 601. The system also compares responsive records with records previously viewed by the user in step 602, and displays a sorted list of responsive records, identifying which of the records have been viewed previously (for example, by displaying their headings in different colors), and user-defined text (if any) in the side panel. See step 603. The user can interact with the system through either window. Through the main window, which displays the text of the selected record (see step 601), the user may:

Jump to the next or previous appearance of a search term (step 604).
Jump to the next or previous record in sequence (step 605).
Jump to the next or previous page within a record (step 606).
Print the unformatted record (step 607).
Select formatted printing option (step 608), causing the system to display formatted record, as shown in step 609. The user then confirms the print order which is then executed. See step 610.

From the list of responsive records in the side panel, the user may (i) decide that the listed records are not sorted in a helpful way (step 615), or (ii) decide that the listed records are not germane to research (step 611). In the first case, the user may either (i) click header to re-sort as in step 616, or (ii) select new sort criteria from the list in the side panel as in step 617.

If the user decides that the listed records are not germane to research at step 611, in one embodiment three options are presented: (i) the user may further limit search by conducting a query on responsive records (step 612); (ii) the user may modify the current query (step 613); or (iii) the user may start a new query (step 614).

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims.

What is claimed is:

1. A method for displaying records responsive to a database query comprising the steps of:
    displaying a list of identifiers for a plurality of said responsive records;
    computing relevance scores for each of the plurality of said responsive records, wherein each of the relevance scores is calculated as a function of frequency of appearance of each of a plurality of database query search terms and proximity of at least two of the plurality of database query search terms;
    recording, in a table or in an array, a number of times one or more of the plurality of said responsive records were displayed in a previous search query;
    displaying selected elements of at least one of said responsive records, wherein one or more of the selected elements relates to textual content of the plurality of said responsive records; and
    allowing a user to select, using one or more input devices, any of the plurality of said responsive records,
    wherein the one or more input devices comprise a computer mouse, a computer keyboard, a computer stylus, and a microphone, and
    wherein said list of identifiers and said selected elements are displayed simultaneously.

2. The method of claim 1, wherein the plurality of said responsive records comprises legal documents.

3. The method of claim 1, wherein one or more of the selected elements comprises text from the plurality of said responsive records.

4. The method of claim 1, further comprising:
    sorting the list of identifiers in response to user input.

5. The method of claim 1, further comprising:
    sorting the selected elements in response to user input.

6. The method of claim 1, wherein the list of identifiers comprises bibliographic information for each of the plurality of said responsive records.

7. The method of claim 1, wherein the recording step further comprises:
    tracking one or more instances in which the user selects any record in the plurality of said responsive records.

8. The method of claim 1, further comprising:
    modifying the relevance scores based on information in the table or the array.

9. An apparatus for displaying records responsive to a database query comprising:
    a digital display of a list of identifiers for a plurality of said responsive records,
    a digital display of a table or of an array, in which a number of times one or more of the plurality of said responsive records were displayed in a previous search query is listed,
    a digital display of selected elements of at least one of said responsive records, wherein one or more of the selected elements relates to textual content of the plurality of said responsive records, and wherein said digital display of the list of identifiers and said digital display of the selected elements are shown to a user simultaneously, and
    one or more input devices for the user to select any of the plurality of said responsive records.

10. The apparatus of claim 9, wherein the plurality of said responsive records comprises legal documents.

11. The apparatus of claim 9, wherein one or more of the selected elements comprises text from the plurality of said responsive records.

12. The apparatus of claim 9, further comprising:
    means for sorting the list of identifiers in response to user input.

13. The apparatus of claim 12, wherein the means for sorting the list of identifiers in response to user input comprises an algorithm, the algorithm comprising a plurality of computations of frequency of occurrence of a plurality of search terms and a method of ordering the plurality of said responsive records based on the plurality of computations of frequency.

14. The apparatus of claim 13, wherein the algorithm further comprises a plurality of calculations for proximity of the plurality of search terms and a method of ordering the plurality of said responsive records based on the plurality of calculations for proximity of the plurality of search terms.

15. The apparatus of claim 9, further comprising:
an algorithm for sorting the selected elements in response to user input, the algorithm comprising a plurality of computations of frequency of occurrence of a plurality of search terms and a method of ordering the plurality of said responsive records based on the plurality of computations of frequency.

16. The apparatus of claim 15, wherein the algorithm further comprises a plurality of calculations for proximity of the plurality of search terms and a method of ordering the plurality of said responsive records based on the plurality of calculations for proximity of the plurality of search terms.

17. A method for displaying search results for a plurality of records in a database, the method comprising:
allowing a user to formulate a search query;
permitting the user to select an amount of text to be displayed for each responsive record in a plurality of responsive records;
comparing the search query to a plurality of records in the database;
determining relevance of each of the plurality of records to the search query, thereby collecting the plurality of responsive records;
selecting one or more identifiers from each of the plurality of responsive records;
selecting a portion of text from each of the plurality of responsive records, wherein the portion of text corresponds to the amount of text;
displaying, simultaneously, the one or more identifiers and the portion of text; and
recording, in a table or in an array, one or more of the plurality of responsive records that were displayed in a previous search query.

18. The method of claim 17, further comprising:
sorting the one or more identifiers based on user input.

19. The method of claim 18, further comprising:
sorting the portion of text based on user input.

* * * * *